(12) United States Patent
Boushley et al.

(10) Patent No.: US 11,665,758 B2
(45) Date of Patent: *May 30, 2023

(54) SYSTEMS AND METHODS FOR DYNAMIC PAIRING OF ELECTRONIC DEVICES

(71) Applicant: Axon Enterprise, Inc., Scottsdale, AZ (US)

(72) Inventors: C. Aaron Boushley, Issaquah, WA (US); Joseph C. Dimino, Seattle, WA (US); Rick Wong, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 241 days.

This patent is subject to a terminal disclaimer.

(21) Appl. No.: 16/724,188

(22) Filed: Dec. 20, 2019

(65) Prior Publication Data

US 2020/0146084 A1 May 7, 2020

Related U.S. Application Data

(63) Continuation-in-part of application No. 16/023,179, filed on Jun. 29, 2018, now Pat. No. 10,912,132.

(60) Provisional application No. 62/492,371, filed on May 1, 2017.

(51) Int. Cl.
| | |
|---|---|
| *H04W 76/15* | (2018.01) |
| *H04W 4/02* | (2018.01) |
| *H04N 7/18* | (2006.01) |
| *H04W 76/11* | (2018.01) |
| *H04B 1/3827* | (2015.01) |

(52) U.S. Cl.
CPC ............ *H04W 76/15* (2018.02); *H04B 1/385* (2013.01); *H04N 7/185* (2013.01); *H04W 4/023* (2013.01); *H04W 76/11* (2018.02)

(58) Field of Classification Search
CPC ..... H04W 76/15; H04W 4/023; H04W 76/11; H04W 8/005; H04W 4/80; H04B 1/385; H04N 7/185
See application file for complete search history.

(56) References Cited

U.S. PATENT DOCUMENTS

| | | | |
|---|---|---|---|
| 2013/0047178 A1 | 2/2013 | Moon et al. | |
| 2013/0189925 A1 | 7/2013 | Staskawicz et al. | |
| 2014/0073262 A1 | 3/2014 | Gutierrez et al. | |
| 2016/0125733 A1* | 5/2016 | Sallas ................... | G08C 23/04 |
| | | | 398/106 |

(Continued)

OTHER PUBLICATIONS

USPTO, Notice of Allowance for U.S. Appl. No. 16/023,179 dated Sep. 23, 2020.

(Continued)

*Primary Examiner* — Yogesh K Aggarwal
(74) *Attorney, Agent, or Firm* — Andrew Graham

(57) ABSTRACT

Police officers and others carry multiple electronic devices with the ability to communicate between each other and with remote devices. Unintentional communications may occur between the devices carried by other police officers, for example, which may cause a device carried by one officer to be controlled by a device carried by a different officer. A method of dynamic pairing between electronic devices, based on the time and proximity of the devices, reduces the possibility for unintentional communications.

20 Claims, 9 Drawing Sheets

(56) References Cited

U.S. PATENT DOCUMENTS

2016/0150350 A1    5/2016   Ingale et al.
2018/0260800 A1    9/2018   Caution et al.

OTHER PUBLICATIONS

United States Patent and Trademark Office, Non-Final Office Action for U.S. Appl. No. 16/023,179 dated Mar. 18, 2020.

\* cited by examiner

SYSTEMS AND METHODS FOR DYNAMIC PAIRING OF ELECTRONIC DEVICES

FIELD OF THE INVENTION

Embodiments of the present invention relate to a creating automatic pairings between electronic devices.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

It is not uncommon for people to carry multiple electronic devices that can communicate between each other wirelessly. Law enforcement officers, for example, may carry several wirelessly connected electronic devices such as cameras, sensor equipped holsters, weapons, microphones, etc. The devices may also wirelessly communicate with electronic devices in police cars as well as between each other. The devices may exchange information wirelessly with remote data centers. The wireless connectivity provides a pathway for the exchange of information and instructions. However, the proximity of officers may enable unintentional wireless communication with electronic devices carried by nearby officers. Similarly, the proximity of devices in patrol cars, or within a police station, for example, may enable unintended communication. A system and method for dynamic pairing of electronic devices, as described herein, may reduce the likelihood of unintentional communication.

A system for dynamic pairing of electronic devices may eliminate manual intervention by a user. However, devices such as smart phones may still require a user's input to create a pairing. Dynamic pairing may permit the prioritization of paired devices. For example, in a system with an electronic device paired with multiple devices, the receipt of instructions from the multiple devices may be dependent on the device's relative priority.

Figure 1:
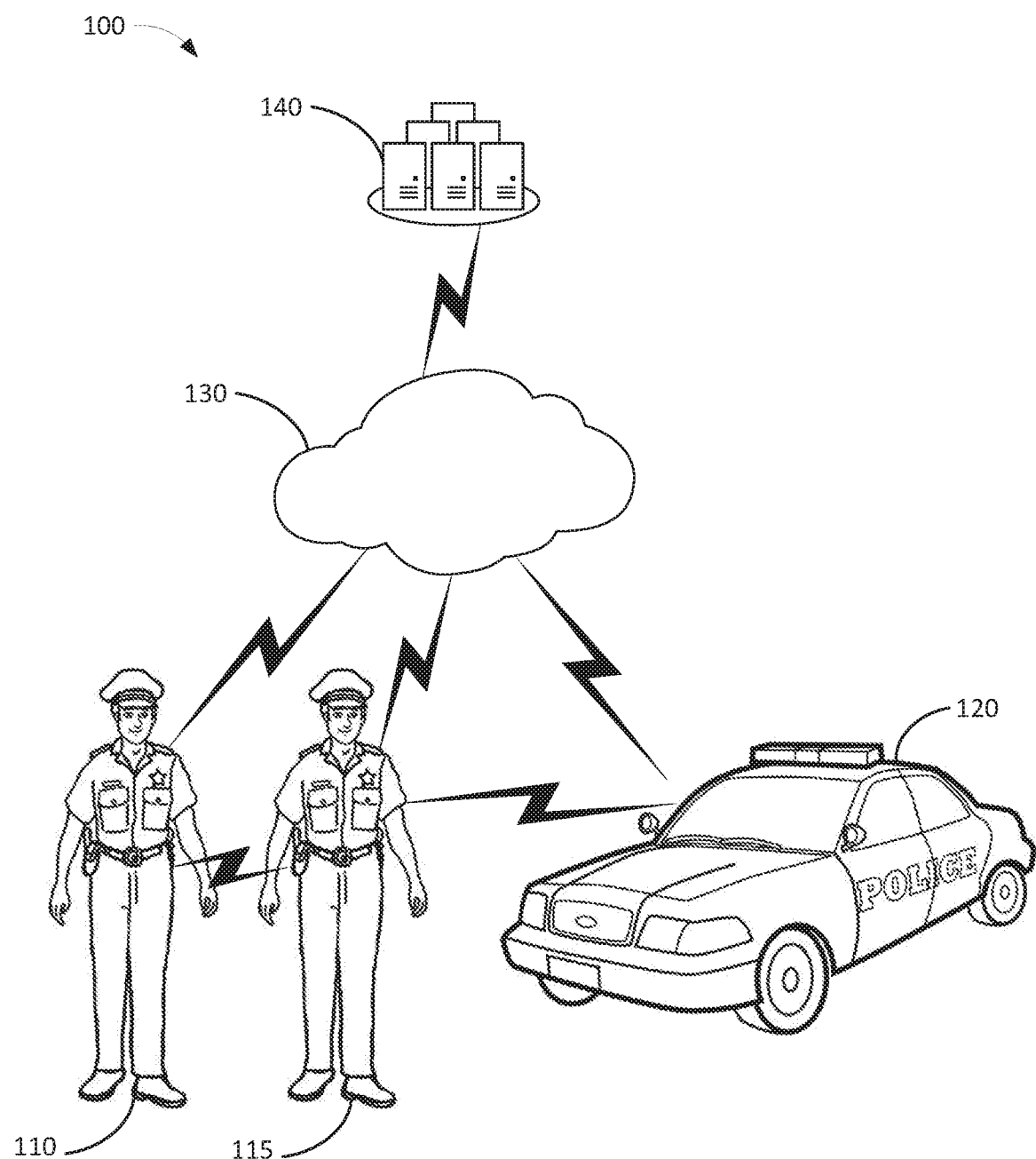
FIG. 1 is a diagram of a system that creates an environment (e.g., ecosystem) for electronic devices to cooperate according to various aspects of the present disclosure.

An example of a system illustrating the interconnections between devices is shown in FIG. 1. System 100 may include users 110 and 115, vehicle 120, computer network 130, and server 140. A user may carry (e.g., wear, worn, attached to, or carried on, a user's body) electronic devices (e.g., smart phone, cellular phone, camera, digital video recorder ("DVR"), microphone, biometric or health monitor). The electronic devices carried by a user may wirelessly communicate (e.g., transmits and/or receive information) between the devices on each user or between the devices on another user nearby (e.g., close, separated by a short distance, proximal).

A user may be a police officer (e.g., law enforcement official, detective, sheriff, deputy). A user may be a member of the armed forces (e.g., member of the military, soldier, warfighter, military police, national guardsman). A user may be any person, or a mix of people (e.g., police officers, military personnel, civilian), carrying electronic devices with the ability to communicate wirelessly between the devices.

User 110 or 115 may communicate with server 140 through network 130. A network provides for the transmission and/or reception of information (e.g., data) via wireless and/or wireless communication links. A network interface enables a system or an electronic device, as discussed below, to communicate with other devices and/or systems over a network. The functions of a network interface may be performed by circuits, logic embedded in hardware, software instructions executable by a processor, or any combination thereof. The functions performed by a network interface enable a computing device to communicate with another device. The functions performed by a network interface, whether using hardware or software executed by a processor, may be referred to as services. A device may request the services of a communication interface to communicate with an electronic device. A network may include one or more network technologies (e.g., internet, local area network ("LAN"), wide area network ("WAN"), metropolitan area network ("MAN")).

A server, as used herein, includes any conventional hardware and software that implements a network node that communicates via a LAN and/or a WAN with electronic devices. A server may include capability to forward messages between networks. In an implementation, the server includes conventional computer systems of a data center for communicating with a relatively large number of electronic devices (e.g., 20 to 20,000).

Vehicle 120 may communicate with user 110 and/or user 115. Vehicle 120 may communicate with server 140 through network 130. A vehicle may include electronic devices (e.g., mobile data terminal ("MDT"), camera, computer, radio, microphone, sensors, navigation system, weapons) that can communicate directly with electronic devices carried by a user. A vehicle's electronic devices may communicate with a user's electronic devices through an access point (e.g., signal unit, hub, data concentrator).

A vehicle may include any machine for transporting people (e.g., automobile, car, bus, truck, van). A vehicle may include machines for providing transportation for specific purposes (e.g., police car, squad car, cruiser, mobile patrol, armored vehicle). A vehicle may be controlled autonomously (e.g., without a driver). A vehicle may be controlled remotely (e.g., drone, unmanned aerial system).

In an implementation, system 200 may include user 210, vehicle 230, network 130, and server 140. User 210 may carry hub 212 and accessories such as holster 214, firearm 216, and microphone 218. Vehicle 230 may include signal unit 232, dash cam 234, MDT 236, microphone 238, and vehicle sensors 240. User 210 and vehicle 230 may communicate with server 140 through network 130 via communication link 224.

A holster is a holder (e.g., case, sheath) for a firearm (e.g., pistol, gun, weapon, conducted electrical weapon ("CEW"), stun gun). A holster may include a processing circuit and a sensor to detect the status (e.g., presence, removal, insertion) of a firearm.

A processing circuit includes any circuitry and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic, transistors). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may have a low power state in which only a portion of its circuits operate or it performs only certain function. A processing circuit may be switched (e.g., awoken) from a low power state to a higher power state in which more or all of its circuits operate or it performs additional certain functions or all of its functions.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus.

A holster may include a communication circuit for transmitting a status. The communication circuit may receive information for controlling or configuring the holster.

A communication circuit transmits and/or receives information (e.g., data). A communication circuit may transmit and/or receive (e.g., communicate) information via a wireless and/or wireless communication link. A communication circuit may communicate using wireless (e.g., radio, light, sound, vibrations) and/or wired (e.g., electrical, optical) mediums. A communication circuit may communicate using any wireless (e.g., Bluetooth, Zigbee, Wireless Access Protocol ("WAP"), WiFi, Near Field Communication ("NFC"), Infrared Data Association ("IrDA"), Long Term Evolution ("LTE"), Bluetooth Low Energy ("BLE"), EDGE, Evolution-Data Optimized ("EV-DO"), BodyLAN, ANT+) and/or wired (e.g., USB, RS-232, Firewire, Ethernet) communication protocols.

A communication circuit may receive information from a processing circuit for transmission. A communication circuit may provide received information to a processing circuit.

A communication circuit in one device (e.g., hub) may communicate with a communication circuit in another device (e.g., holster). Communications between two devices may permit the two devices to cooperate in performing a function of either device.

Hub 212 may include camera 222 and/or DVR 223. Hub 212 may include a processing circuit as described above. Hub 212 may communicate with holster 214, firearm 216, and/or microphone 218 via communication links 220. Hub 212 may communicate with server 140 through network 130 via communication link 224.

In an implementation, camera 222 may perform the functions of a hub. A camera may perform the functions of a DVR. A camera may record still image. A camera may record audio and/or visual data. A combination of still and video images may be recorded by a camera. A camera may include a processing circuit and communication circuit as described above.

The electronic devices carried by user 210 may communicate with other devices carried by other users via communication link 242. Vehicle 230 may communicate with user 210 via communication link 242.

MDT 236, microphone 238, vehicle sensors 240, dash cam 234 and signal unit 232 may communicate between each other over a wired (e.g., bus) or wireless connection. In an implementation, signal unit 232 may perform the functions of an access point for vehicle 230. The electronic devices of vehicle 230 may communicate with network 130 through signal unit 232 and communications link 224. Signal unit 232 may serve as the access point for communications with the devices carried by user 210. In another implementation, the devices of vehicle 230 may communicate directly with the devices carried by user 210.

To prevent unintentional (e.g., unwanted, accidental, inadvertent, unexpected, unforeseen, unintended) communications between electronic devices carried by a user, between users, or between a user and a vehicle, pairing is needed. Pairing, as used herein, is the establishment of a secure connection or association between two electronic devices. Once paired, the association remains established until either device terminates the pairing. Unintentional communications are avoided by permitting only paired electronic devices to transmit and/or receive information for performing a function between each device.

Figure 3:
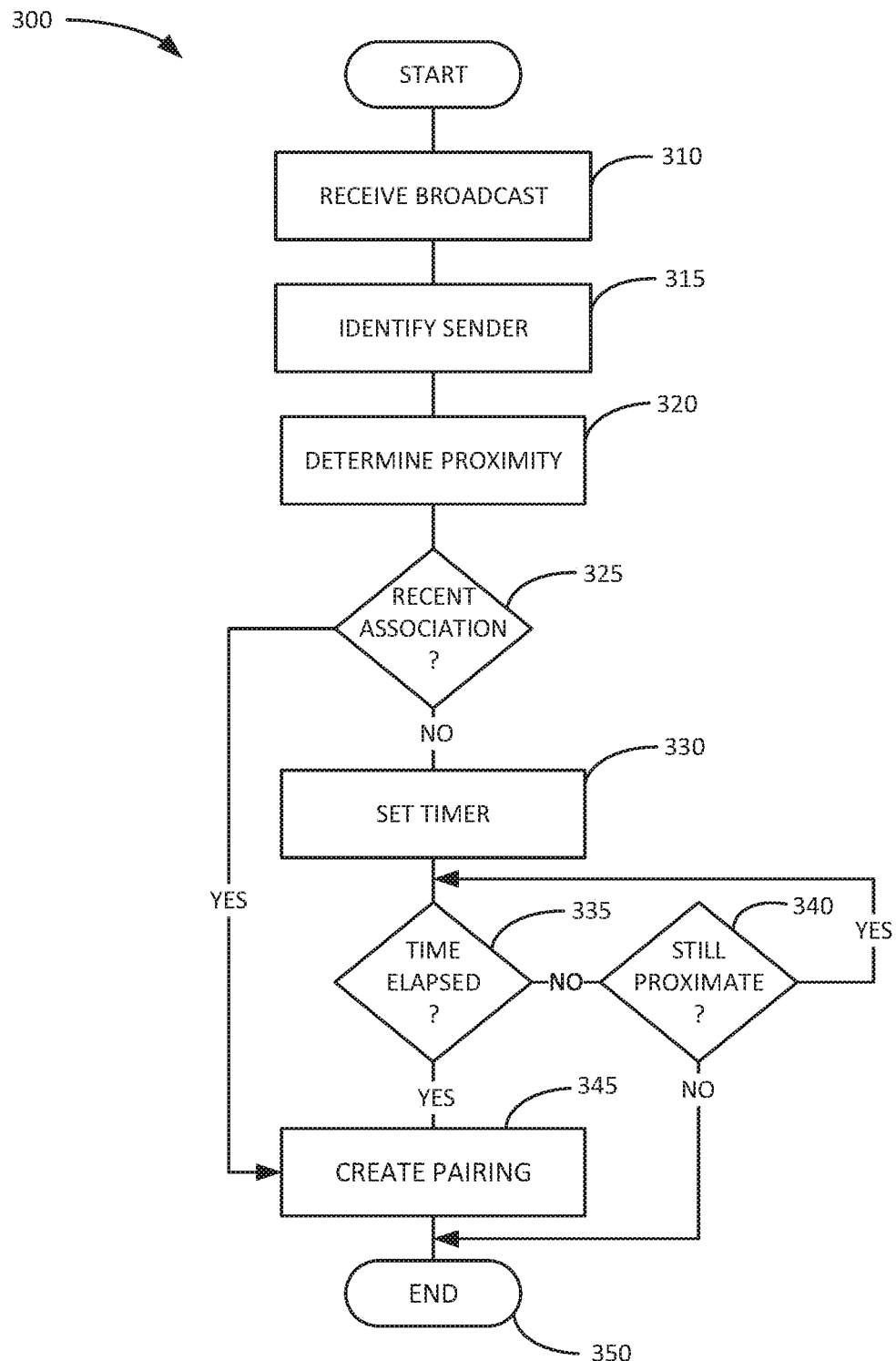
FIG. 3 is a flow chart of a method for establishing a pairing between two electronic devices in an implementation of the system of FIGS. 1 and 2.

Pairing method 300, shown in FIG. 3, is performed by hub 212 to establish an association an accessory, such as holster 214, firearm 216, microphone 218, and/or any of the devices of vehicle 230. Method 300 includes receive broadcast 310, identify sender 315, determine proximity 320, recent association 325, set timer 330, time elapsed 335, still proximate 340, create pairing 345, and end 350.

In receive broadcast 310, hub 212 monitors its receiver until an identifying signal is received. Each electronic device of user 210 and/or vehicle 230 may broadcast a signal (e.g., Bluetooth advertisement, beacon) that includes an identifier (e.g., serial number, device identifier). The identifier may include a device type in the transmission. Execution proceeds to identify sender 315.

In identify sender 315, hub 212 determines if the identifier extracted from the broadcast matches an approved device (e.g., holster, firearm, microphone, signal unit). The approved devices may be stored in hub 212. The list of approved devices may be stored on server 140. If the device is on the approved list, execution proceeds to determine proximity 320.

In determine proximity 320, hub 212 determines (e.g., estimates, calculates, computes) a distance to the device transmitting the broadcast identifier. Hub 212 may determine the distance by measuring the received signal strength. The distance may be determined by received coordinates included in the broadcast. Time of arrival of the broadcast may be used to determine the distance by comparison with the time the broadcast was transmitted. Once a distance has been determined, it is compared to a predetermined limit (e.g., two meters). The predetermined limit may be set by user 110 or 115. Server 140 may set the distance limit in hub 212. If within the distance limit execution proceeds to recent association 325.

In recent association 325, hub 212 compares the broadcast device identifier with those of devices that were previously paired. The list of devices previously paired may be stored in memory in hub 212 or on server 140. The list may be cleared (e.g., erased, reset, emptied) when hub 212 is activated (e.g., power applied, turned on, switched on). The list may be cleared when hub 212 is inserted into and/or removed from a docking station. The list may be periodically (e.g., daily, every shift change, weekly) cleared. The list may include a date and/or time when the most recent pairing was disabled.

If a recent (e.g., within one hour, within one day) pairing existed between hub 212 and another device, execution proceeds to create pairing 345. Otherwise, execution proceeds to set timer 330.

In set timer 330, a timer (e.g., counter, clock) is started to measure a duration of time. The timer may be included in the processing circuit of hub 212. Once the timer has started, execution proceeds to time elapsed 335.

In time elapsed 335, the elapsed duration of time is compared with a predetermined value (e.g., fifteen minutes) by hub 212. The predetermined duration of time may be set by a user. Server 140 may configure hub 212 with a predetermined duration of time. Hub 212 may be programmed to determine the duration of time using an algorithm (e.g., artificial intelligence, machine learning). If the duration of time has not elapsed, execution proceeds to still proximate 340. If the duration of time has elapsed, execution proceeds to create pairing 345.

In still proximate 340, hub 212 determines the distance to the device broadcasting the identifier from receive broadcast 310. Hub 212 determines distance as described in determine proximity 320 above. If the distance is within the limit, execution loops to time elapsed 335. If the distance is no longer within the limit, no pairing is created and execution proceeds to end 350.

In create pairing 345, a pairing between hub 212 and the broadcasting device is established. Until the pairing is disabled, hub 212 and the broadcasting device may exchange information between each other to perform one or more functions.

Pairing may be disabled (e.g., discontinued, broken) if the device paired with hub 212 is no longer close to the paired device for a period of time (e.g., fifteen minutes). For example, if user 210 leaves vehicle 230 while hub 212, carried by user 210, is paired with signal unit 232, pairing may be disabled until user 210 returns to the vehicle. In another example, user 210 may place hub 212 into a docking station which may cause pairings to be disabled.

Figure 4:
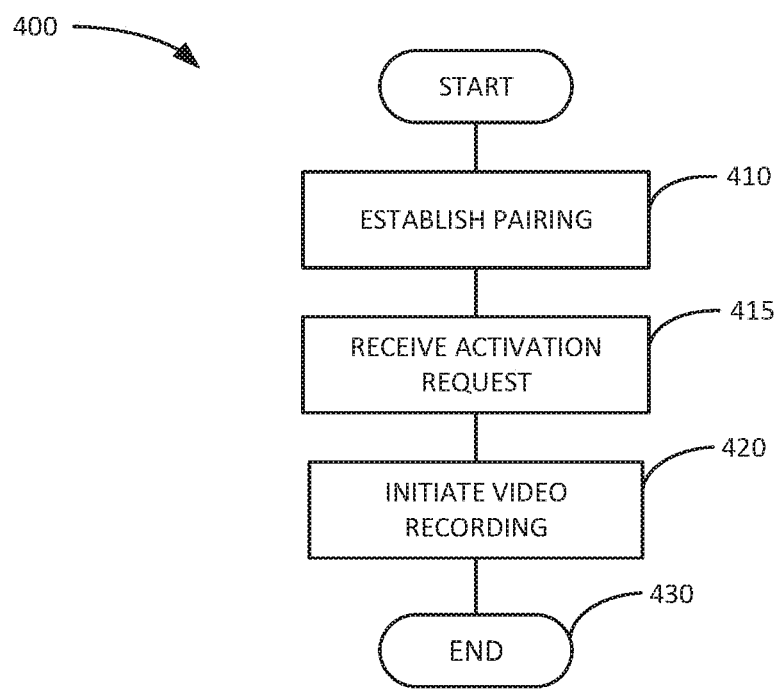
FIG. 4 is a flow chart of a method for activating video recording in a paired device in an implementation of the system of FIG. 2.

Once electronic devices are paired, one device may initiate an activity (e.g., function) in the other device. Activation method 400, shown in FIG. 4, initiates video recording in hub 212. Activation method 400 includes establish pairing 410, receive activation 415, initiate recording 420, and end 430.

In establish pairing 400, pairing is created between two devices, as described in method 300. Once a pairing is created, execution proceeds to receive activation 415.

In receive activation 415, a request (e.g., message, instruction, command) is received by hub 212 to begin recording audio and/or visual data from camera 222. The request may be validated by hub 212. Execution may then proceed to initiate recording 420.

In initiate recording 420, recording may be performed by DVR 223 and or camera 222. The recorded audio and/or video information may include audio and video information from a period of time prior (e.g., loop back) to receiving an activation request (e.g., thirty seconds). For example, removal of a firearm from holster 214, paired with hub 212, may generate an activation request to initiate audio and/or video recording of information captured by camera 222 and/or microphone 218. In another example, firing of weapon 220, paired with hub 212, may trigger recording of audio and/or video data. In yet another example, signal unit 232, paired with hub 212, may activate the DVR in response to vehicle sensors 240. Audio and/or video recording may continue until discontinued (e.g., stopped, suspended, ended) by user 110 or 115. Recording may be discontinued by a command from a paired device. Server 140 may issue instructions to discontinue recording. Execution proceeds to end 430 after recording has been initiated.

Figure 5:
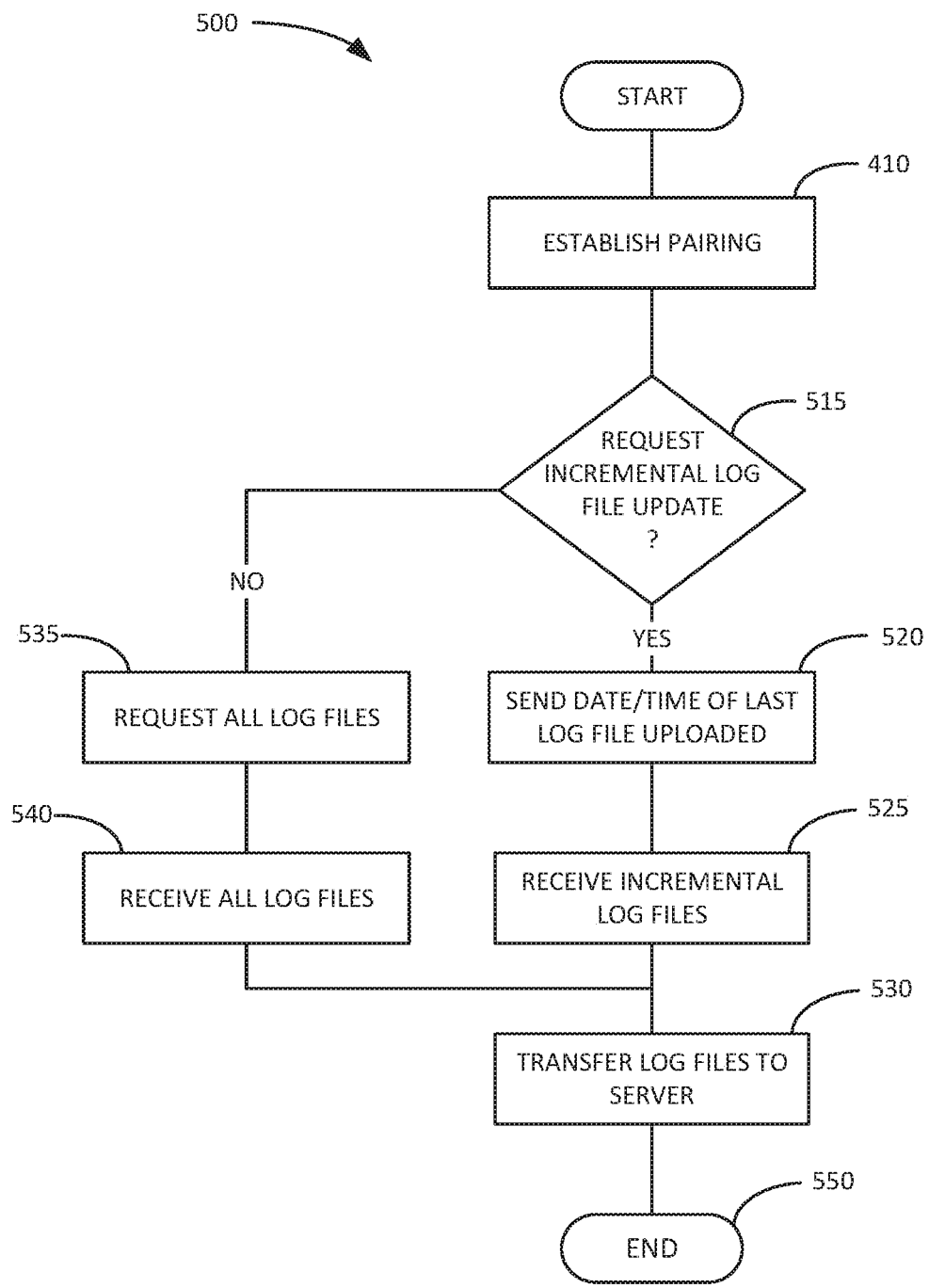
FIG. 5 is a flow chart of a method for transferring information to a server from an electronic device through a paired device in an implementation of the system of FIG. 2.

The electronic devices carried by user 210 or on vehicle 230 may create a log file (e.g., history, record) that includes, for example, status, date and/or time of events, record of use, conditions of use, power levels, etc. The logs may be transferred through a paired device to a server for storage. Upload log files method 500, shown in FIG. 5, executed by hub 212, provides a method for a paired device to receive a request through hub 212 for a log file(s), and to provide the requested log file(s). Method 500 includes establish pairing 410, request log 515, send date/time 520, receive incremental 525, transfer logs 530, request all 535, receive all 540, and end 550.

In establish pairing 410, pairing is created between two devices as described above. Execution then proceeds to request log 515.

In request log 515, hub 212 transmits a log request to the paired device. The log request sent from hub 212 may have originated from a user. Hub 212 may have received the request from server 140. If the request is for all log files in the paired device, execution proceeds to request all 535. If only logs from a specified date and/or time are requested, execution proceeds to send date/time 520. Incremental log requests may include log requests other than requests for all log files. Incremental log requests may be for a subset of log files.

In send date/time 520, a request for log files is sent to the paired device. The request may be for log files with a date/time equal to or after a specified date/time. The request may be for log files not previously sent by the paired device or received by hub 212 or server 140. The request may be for any combination of date/time and event information included in a log file. Upon sending the request to the paired device, execution proceeds to receive incremental 525.

In receive incremental 525, hub 212 receives the log files transmitted by the paired device in response to the request. Hub 212 may validate (e.g., authenticate, detect and/or correct transmission errors) the received log files. After receipt of the log files, execution proceeds to transfer logs 530.

In request all 535, hub 212 transmits a request for all log files stored in the paired device. A request for all log files may include log files that had previously been transmitted by the paired device. After transmitting the request, execution proceeds to receive all 540.

In receive all 540, hub 212 receives the log files transmitted by the paired device. Hub 212 may validate the received log files. Execution proceeds to transfer logs 530.

In transfer logs 530, hub 212 transmits the logs files received from the paired device to server 130 through communications link 224 and network 130. After confirmation from server 130 that the log files have been received, execution proceeds to end 550.

Figure 6:
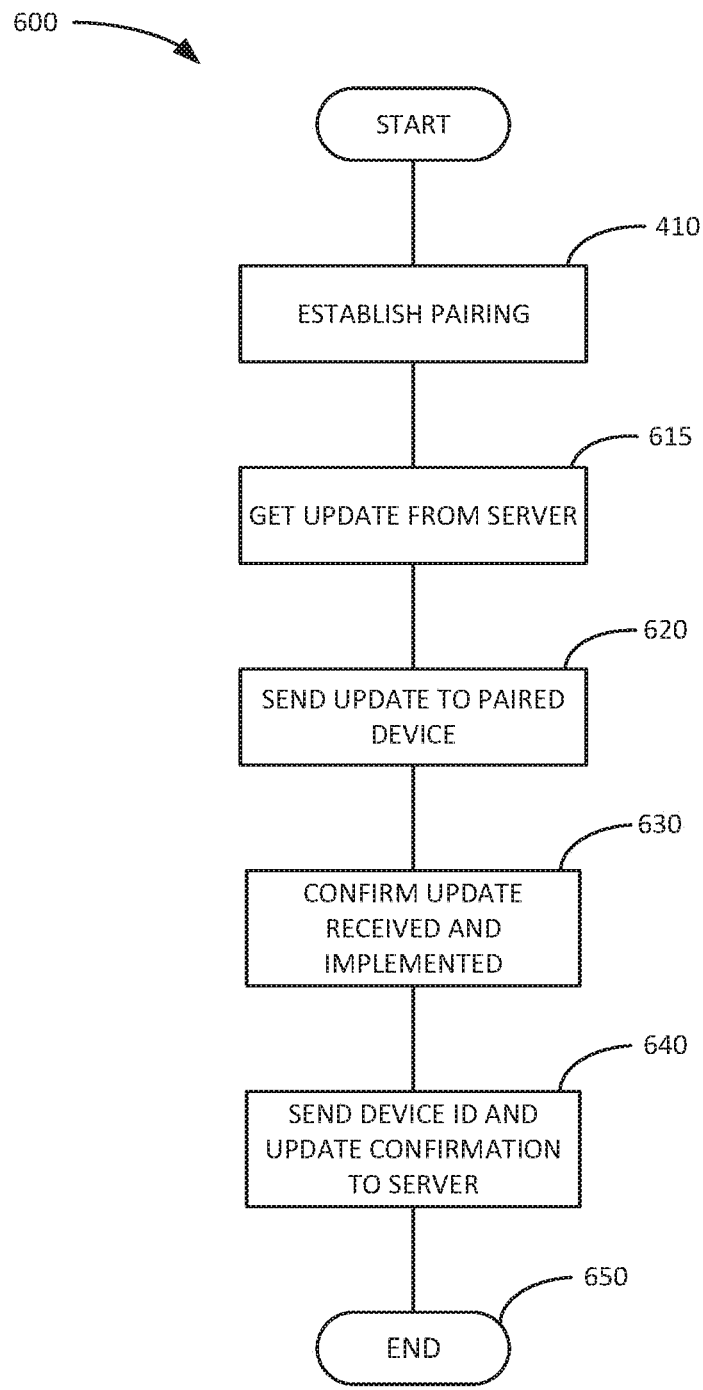
FIG. 6 is a flow chart of a method for transferring information from a server to an electronic device through a paired device in an implementation of the system of FIG. 2.

Log files and audio/video recordings may include date and/or time stamps. To maintain the accuracy of the date and/or time, server 140 may send synchronizing information to hub 212 and/or electronic devices paired to hub 212. Server 140 may also send configuration information (e.g., operational settings, modes of operation, parameter values) to hub 212 and/or devices paired to hub 212. Configuration method 600, shown in FIG. 6, includes establish pairing 410, get update 615, send update 620, confirm update 630, send ID 640, and end 650.

In establish pairing 410, pairing is created between two devices as described above. Execution then proceeds to get update 615.

In get update 615, an update from server 140 is received by hub 212. The update may include a date and/or time synchronization instruction for the paired device. The update may confirm or alter configuration settings for the paired device. The update may be a request for status (e.g., battery status, power levels, configuration settings, identifying information, software/firmware versions, date/time of last update) of the paired device. Execution proceeds to send update 620 after hub 212 has received the update request.

In send update 620, hub 212 transmits the update to the paired device. Execution then proceeds to confirm update 630.

In confirm update 630, hub 212 waits for confirmation from the paired device that the request has been received and is valid. If a confirmation has not been received, hub 212 may retransmit the request. If a confirmation indicates that the request is invalid, or if a confirmation is not received within a duration of time, hub 212 may notify server 140 or user 110 or 120 that a request is invalid or that the request cannot be executed. If confirmation is received from the paired device indicating a correct and valid request, execution proceeds to send ID 640.

In send ID 640, hub 212 receives confirmation from the paired device that the request is valid and has been executed. Hub 212 may transmit the confirmation to server 140. The confirmation may include the paired device identifier and/or serial number. The confirmation may include a status of the paired device. Server 140 may acknowledge receipt of the updated information by transmitting a message to hub 212. Execution proceeds to end 640 after hub 212 has sent confirmation to server 140.

In embodiments, determining whether an electronic device remains proximate may include receiving an identifying signal from the electronic device. Remaining proximate may include being within a range of communication for a broadcast identifying signal of the electronic device. Receiving the identifying signal by a first electronic device may indicate that the first electronic device is within a range of communication of a second electronic device from which the identifying signal is received. Accordingly, remaining proximate may be determined in accordance with receiving one or more identifying signals. In such embodiments, determining that the second device remains proximate to the first device over a duration of time may include receiving a number of identifying signals from the second device during a duration of time, wherein each identifying signal includes an identifier associated with the second electronic device. A proximity may be determined in a binary manner, the binary manner including whether another identifying signal is received or not received, thereby simplifying the determination relative to other manners of determining the proximity. Determining the proximity and whether another device remains proximate in this manner may also avoid signal propagation issues that may impact a received signal strength indicator, time of flight, or other properties of an identifying signal associated with one or more conditions under which a signal is transmitted between two electronic devices.

In embodiments, a duration of time may be associated with a number of a plurality of identifying signals received. Measuring the duration of time may include measuring a time of receipt between a first received identifying signal with an identifier and a time of receipt of a most recently received identifying signal with the same identifier, each of the first received identifying signal and the most recently identifying signal included as a identifying signal in the plurality of identifying signal. Each time a new identifying signal with the identifier is received, the duration of time may increase as measured by an electronic device. The duration of time may correspond to a time required to receive the number of the plurality of identifying signals.

In embodiments, measuring a duration of time a first electronic device receives an identifier may include comparing a number of the plurality of identifying signals to a threshold number. The identifying signals may be second identifying signals received after a first identifying signal with a same identifier has been received by the first electronic device. The first and second identifying signals may be broadcast from a same second electronic device. When the number of the plurality of identifying signals is equal to less than the threshold number, a pairing between the first electronic device and second electronic device may not be established. When the number of the plurality of identifying signals is greater than the threshold number, the pairing may be established.

By virtue of a time required to receive each identifying signal of a plurality of identifying signals, comparing a number of plurality of identifying signals may also be associated with comparing a duration of time required to receive the number of plurality of identifying signals to a threshold time. The threshold time may corresponds to a minimum amount of time required to receive the number of identifying signals greater than a threshold number. The threshold time may be determined in accordance with various factors, including the threshold number, a frequency with which the identifying signals are transmitted by the second electronic device. For example, if a threshold number is thirty identifying signals and each identifying signal is transmitted at an interval of five seconds, a threshold time may be at least two and a half minutes, wherein thirty times five seconds equals the two and a half minutes. In embodiments, a threshold time may further account for an elapsed time of receipt between each identifying signal. For example, if a second threshold time of ten seconds is provided for an elapsed time of receipt for each of thirty identifying signals and the threshold number remains thirty identifying signals, a threshold time for receiving the threshold number of signals may be equal or greater than five minutes, which corresponds to thirty times ten seconds. In other embodiments, a threshold time for comparing to a duration of time identifying signals are received may be selected separate from a time threshold, transmission interval, or other factor related to the identifying signals. Each threshold time may be stored in an electronic device on which the respective threshold time is used.

In embodiments, determining a proximity of an electronic device may further require each identifying signal to be received from the electronic device in a timely manner. An elapsed time of receipt may be determined for one or more identifying signals of a plurality of identifying signals. The one or more identifying signals may include each identifying signal received after a first identifying signal. The elapsed time of receipt may include a time difference between a time of receipt of the identifying signal and a time of receipt of a previously received identifying signal. The previously received identifying signal may include the identifying signal received immediately prior to the identifying signal for which the elapsed time of receipt is being determined. The plurality of identifying signals may be received sequentially and/or at a regular interval.

In embodiments, requiring the identifying signal to be received in a timely manner may include comparing an elapsed time of receipt for each identifying signal of a plurality of identifying signals to a threshold time. If the elapsed time of receipt is less than the threshold time, the electronic device from which the identifying signal was broadcast may be determined to remain proximate. If the elapsed time of receipt is greater than the threshold time, the electronic device may be determined to not remain proximate. In embodiments, each elapsed time of receipt determined for a respective identifying signal in the plurality of identifying signals may be required to be less than the time threshold in order for the electronic device to be determined to remain proximate.

In embodiments, measuring a duration of time over which identifying signals with a same identifier are received may involve a plurality of threshold times. A first threshold time of the plurality of threshold times may be a threshold time to which an elapsed time of receipt for an individual identifying signal may compared. A second threshold time of the plurality of threshold times may include a threshold time to which a duration of time to receive the plurality of identifying signals may be compared. The first threshold time may be less than the second threshold time. In embodiments, the second threshold time may be equal or greater than a multiple of the first threshold time. The multiple may correspond to a threshold number to which a number of the plurality of identifying signals is compared. In embodiments, each threshold time of the plurality of threshold times may be stored in memory of an electronic device. Each threshold time of the plurality of threshold times may be further determined in accordance with an input received at the electronic device, including an input directly received via a user interface of the electronic device or an input received via a communication circuit of the electronic device from a remote server or other second electronic device.

Figure 7:
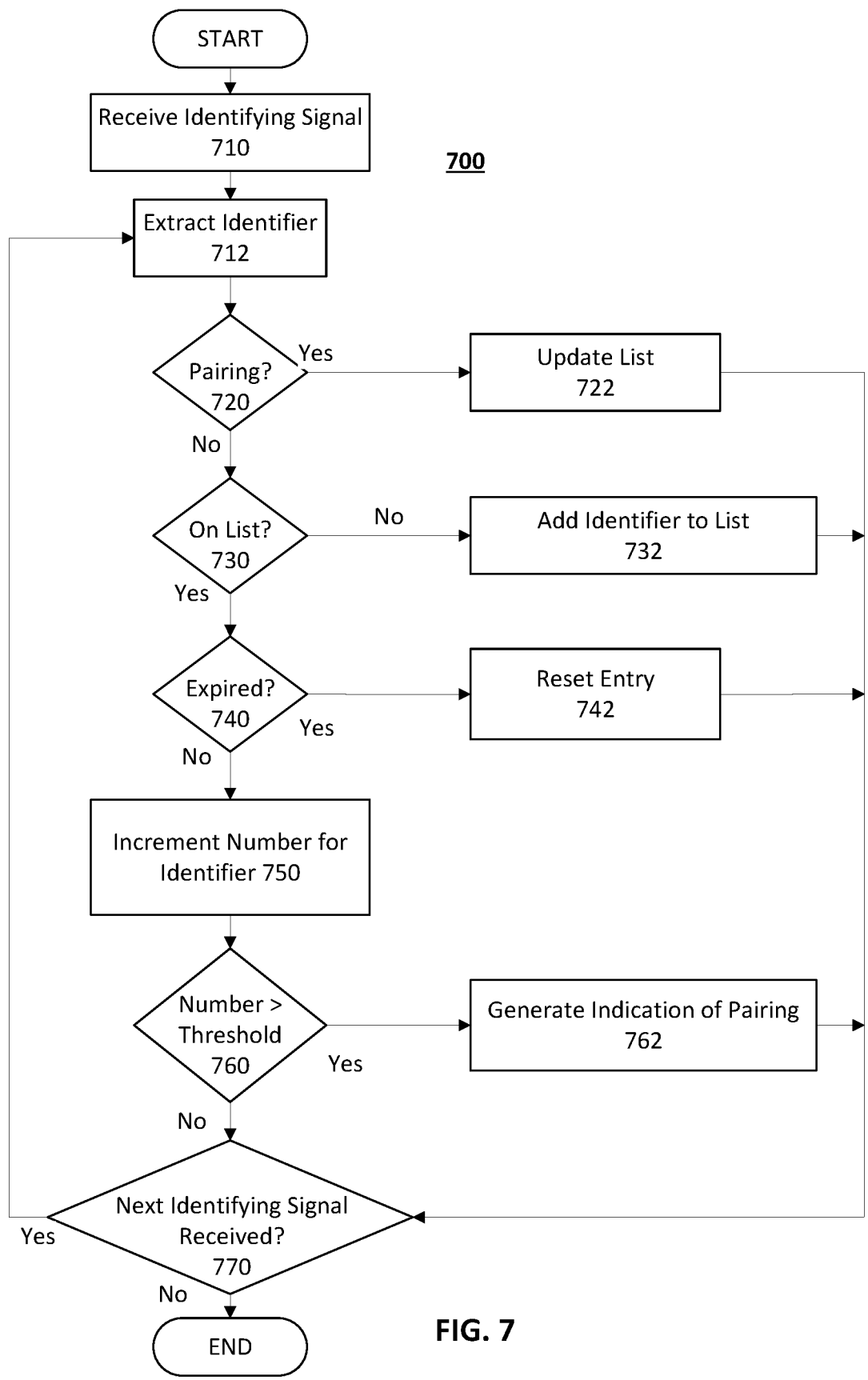
FIG. 7 is a flow chart of a method for automatic pairing according to various aspects of the present disclosure.

A method of dynamic pairing in embodiments according to various aspects of the present disclosure is shown in FIG. 7. Method 700 may be implemented on an electronic device. The electronic device may be a first electronic device to be dynamically paired with one or more second electronic devices via method 700. For example, hub 212 may be configured to perform one or more operations of method 800 (with brief reference to FIG. 2). The electronic device may include at least one computer-readable media storing instructions that, when executed by a processor of the electronic device, cause the processor and/or electronic device to perform one or more operations of method 700.

To start, the electronic device may receive an identifying signal 710 as part of method 700. The identifying signal may be received via one or more of a network interface and communication unit. The identifying signal may be received wirelessly. The identifying signal may include a first identifying signal received from an electronic device. The identifying signal may include a broadcast packet. The identifying signal may be broadcast to each electronic device with a range of communication of another electronic device from which the identifying signal is received. The identifying signal may be unaddressed. For example, the identifying signal may include one or more of a short-range wireless beacon or advertisement. In embodiments, the identifying signal may not include an indication, address, or other identifier associated with the electronic device that receives the identifying signal 710. In such an arrangement, a plurality of electronic devices within a range of communication of a particular electronic device may receive the identifying signal, independent of whether each electronic device of the plurality of electronic devices is respectively paired with the particular electronic device. In embodiments, receiving the identifying signal may correspond to receiving broadcast 310 (with brief reference to FIG. 3). The electronic device may receive the identifying signal 710 independent of whether a pairing is established between the electronic device and a second electronic device from which the identifying signal was broadcast. In embodiments, the electronic device may receive the identifying signal 710 prior to a pairing being established between the electronic device and a second electronic device from which the identifying signal is broadcast.

After the identifying signal is received, the electronic device may extract an identifier 712. The identifier may be extracted from the identifying signal. The identifier may be extracted from a broadcast packet in the identifying signal. The identifier may include one or more of a serial number, device number, and a device type of the transmission. In embodiments, the identifier may be associated with a second electronic device from which the identifying signal was received. The identifier may identify the second electronic device. The identifier may differentiate the second electronic device from other electronic devices from which one or more other identifying signals may be respectively received by the electronic device. In embodiments, identifying sender 315 may include extracting the identifier 712 (with brief reference to FIG. 3). The extracted identifier may be stored in system memory for subsequent processing. For example, the extracted identifier may be stored in system memory temporarily in order to determine whether a pairing is established between the electronic device and another electronic device associated with the identifier.

After extracting an identifier 712, the electronic device may determine whether a pairing is established 720 for the identifier. The pairing for the identifier may be established between the electronic device and another electronic device with which the identifier is associated. Determining whether the pairing is established may include determining if the pairing is established and if the pairing is not established. In embodiments, a recent association 325 may include determining whether the pairing is established 720 (with brief reference to FIG. 3).

In embodiments, determining whether the pairing is established 720 may include comparing the identifier with a list of electronic devices. The list of electronic devices may be stored in memory on the electronic device. The list may include an entry for each identifier received by the electronic device. Each entry may include a respective identifier. Each entry may further include an indication of whether a pairing is established by the electronic device with another electronic device with which the identifier associated. Comparing the identifier may include matching the identifier with an entry in the list of devices that includes the identifier and determining whether the entry further includes an indication of whether the pairing is established. The pairing may be determined to be established if the entry includes the indication. If the entry does not include the indication, the pairing may be determined to not be established.

In embodiments, an entry for an identifier may include a set of information related to the identifier and the electronic device with which the identifier is associated. The set of information may include one or more of a last received time, corresponding to a time at which an identifying signal with the identifier was last received by the electronic device. The set of information may include a number of a plurality of identifying signals with the identifier that have been received. The number may correspond to a count of the plurality of identifying signals. The number may be incremented each time an identifying signal with the identifier is received. The set of information may include a measured duration of time associated with the identifier, corresponding to a period time over which a plurality of identifying signals with the identifier have been received.

Figure 8:
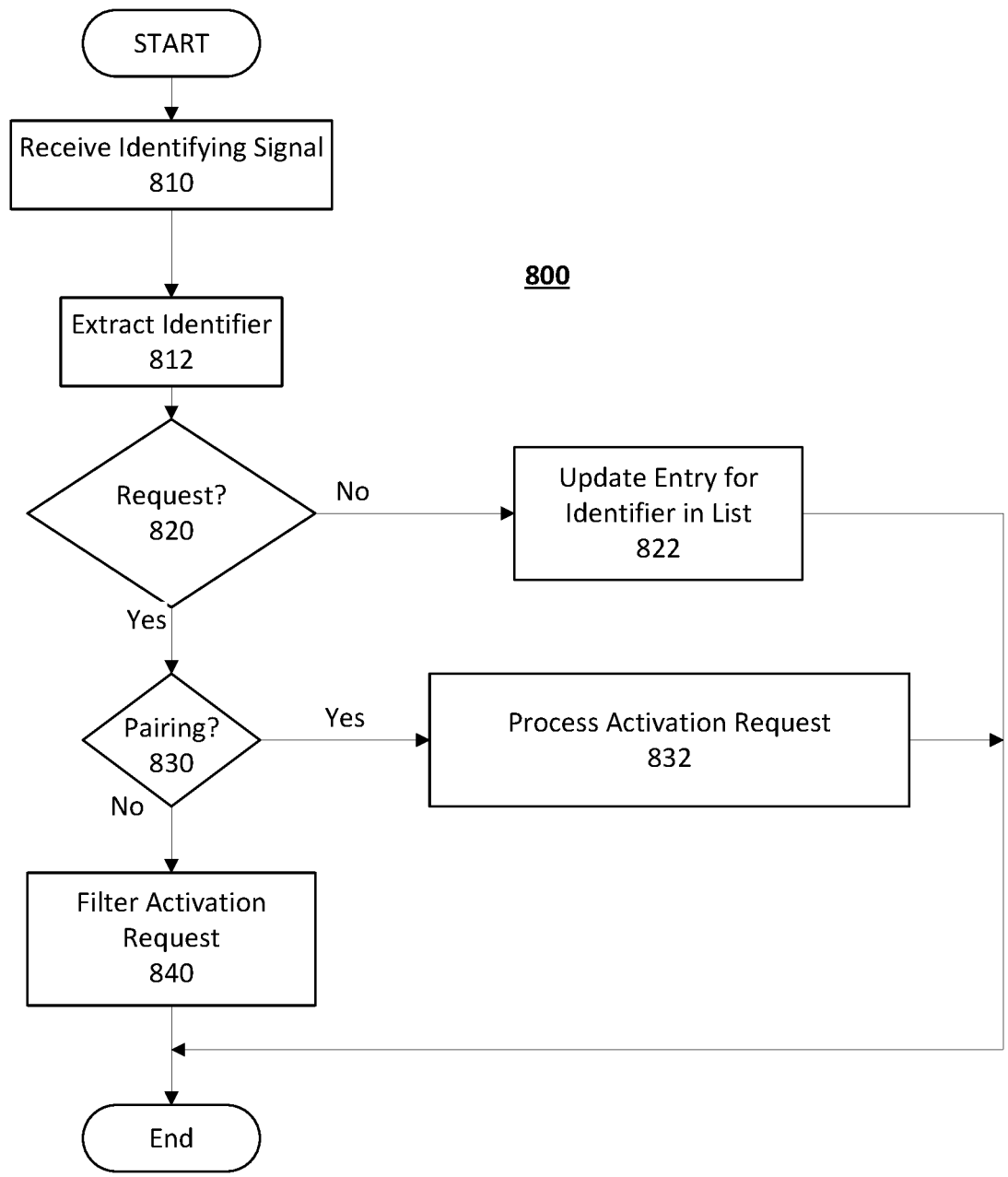
FIG. 8 is a flow chart of a method for automatic pairing according to various aspects of the present disclosure.

If the pairing is determined to be established, the electronic device may update the list of devices 722. Updating the list of devices may include updating an entry for the identifier in the list. For example, a last received time may be updated for the entry in the list for the identifier. A number of a plurality of identifying signals may alternately or additionally be incremented (e.g., increased by one). Updating the list of devices 722 may provide indication of a current status of the pairing between the electronic device and a second electronic device associated with the identifier, including whether the second electronic device remains proximate to the electronic device. In embodiments, one or more operations as illustrated in FIG. 8 may also be performed if the pairing is determined to be established.

If the pairing is determined to not be established, the electronic device may determine whether the identifier is included on a list of devices 730. Determining whether the identifier is one the list may include comparing the identifier to an identifier of one or more entries in the list of devices. If an identifier of an entry of the one or more entries matches the identifier extracted from the received identifying signal, the identifier extracted from the received identifying signal may be determined to be included on the list of devices. If an identifier of each entry of the one or more entries does not match the identifier extracted from the received identifying signal, the identifier extracted from the received identifying signal may be determined to not be included on the list of devices. The identifier, when determined to be included in the list of devices, may be associated with a second electronic device from which an identifying signal has been previously received. The identifier, when determined to not be included in the list of devices, may be associated with a second electronic device from which an identifying signal has not been previously received. The identifier, when determined to not be included in the list of devices, may be associated with a second electronic device from which an identifying signal has not been received recently, such that an entry for the second electronic device may have been previously removed from the list of devices.

If the identifier is not determined to be included on the list of devices 730, the identifier may be added to the list of devices 732. Adding the identifier to the list of devices 732 may include generating a new entry for the list of devices. The new entry may include the identifier. The new entry may include a default number for a plurality of identifying signals associated with the identifier. In embodiments, the number may be one, indicating that the identifier was received in a first identifying signal received from a second electronic device. In embodiments, the number may be zero, such that a number of a plurality of identifying signals for the entry corresponds to a plurality of second identifying signals received after a first identifying signal by which the identifier is added to a list of devices 732.

In embodiments, adding the identifier to the list of devices 732 may include removing an entry from the list of devices. For example, an entry with an oldest last received time may be removed from the list of devices. Alternately, an entry with a lowest number of a plurality of identifying signals may be removed. In embodiments, an entry for the identifier determined to not be included on the list of devices may be added to the list in place for the removed entry. By removing an entry from the list of devices, an amount of memory for storing the list may be minimized and/or comparisons of identifier to the list of devices may be conducted more quickly. Removing the entry may also ensure that a pairing may be established with an active second electronic device with which the electronic device is most proximate and thus likely intended to be paired with the electronic device.

If the identifier is determined to be included on the list of devices 730, the electronic device may determine if an entry for the identifier is expired 740. If the identifier is included in the list, the identifier may be received in a second identifying signal received from a same second electronic device. The second identifying signal may be one of a plurality of second identifying signals received from the second electronic device. The second identifying signal may be received in sequence after one of a first identifying signal from the second electronic device or another second identifying signal of the plurality of second identifying signals.

In embodiments, determining if an entry for the identifier is expired 740 may include determining an elapsed time of receipt for the identifier. The elapsed time of receipt may correspond to a difference in time between when the identifying signal with the identifier is received by the electronic device and a time at which another identifying signal with the same identifier was received by the electronic device. The other identifying signal may be one of a first identifying signal and a second identifying signal for the identifier. The time at which the other identifying signal was received may be indicated by a last received time included in the entry. Determining the elapsed time of receipt may include subtracting the last received time of the entry for the identifier from a time at which the identifier was received by the electronic device.

In embodiments, determining if an entry for the identifier is expired 740 may include comparing an elapsed time of receipt for the identifier to a threshold time. The threshold time may correspond to a maximum time during which the electronic device may be outside a range of communication of a second electronic device associated with the identifier. The threshold time may indicate whether the second electronic device remains proximate to the electronic device and/or the electronic device remains proximate to the second electronic device, wherein remaining proximate is defined in accordance with receiving an identifying signal with the identifier. In embodiments, the threshold time may include at least fifteen seconds, at least thirty seconds, at least one minute, at least two minutes, at least three minutes, at least four minutes, or least five minutes. In embodiments, a threshold time may be selected in accordance with a maximum period of time the electronic device may be expected to receive identifying signals from multiple second electronic devices, such that intermittent identifying signal from second electronic device not to be paired are excluded for further processing by the threshold time. The threshold time may also be selected in accordance with a minimum desired time for the pairing to be established and available for use by the electronic device, as the electronic device may filter one or more requests from a second electronic device during the threshold time before the pairing is established with the second electronic device.

In embodiments, if the entry for the identifier is expired, the electronic device may reset the entry 742. Resetting the entry 742 may include changing one or more information in the entry. For example, a number of a plurality of identifying signals for the entry may be reset to a default number. The default number may be a same default number as generated for adding a new entry when the identifier was first added to the list of devices 732. Resetting the entry 742 may prevent pairing from being established with a second electronic device that has not remained proximate to the electronic device. By resetting the entry 742, the electronic device may ensure that the second electronic device associated with the identifier remains proximate in accordance with one or more of a threshold number and/or threshold time.

If the entry for the identifier is not expired, the electronic device may increment a number of a plurality of identifying signals for the identifier 750. Incrementing the number may include increasing the number of plurality of identifying signals stored in an entry for the identifier in a list of devices. For example, incrementing may include increasing the stored number by a predetermined value, such as one. By incrementing the number 750, a duration of time associated with the number may be measured. By incrementing the number 750 after determining whether the identifier and an entry in a list of devices associated with the identifier is expired 740, the electronic device may ensure that the measured duration of time corresponds to a duration of time in which a second electronic device has remained proximate to the electronic device, thereby excluding one or more second electronic devices that may only intermittently proximate to the electronic device for the duration of time and to which the electronic device should not be paired.

In embodiments, the electronic device may compare a number of a plurality of identifying signals for an identifier with a threshold number 760. The threshold number may be stored in memory of the electronic device. The threshold number may correspond to a number of packets broadcast from a second electronic device that are required to be successfully received before pairing is established. The threshold number may be selected in accordance with a duration of time for which a second electronic device associated with the identifier, as represented by the number, should remain proximate to the electronic device before being paired. The second electronic device may be known to transmit the identifying signals with the identifier at a periodic rate, such that a minimum amount of time for receiving a number of a plurality of identifying signals may be known and incorporated into a selection of the threshold number. A lower relative number may enable pairing to be established quickly. A higher number may increase a duration of time for which the second electronic device is required to remain proximate for pairing. In embodiments, a threshold number may include at least thirty, at least sixty, at least ninety, or at least one-hundred twenty identifying signals. If the number of the plurality of identifying signals is greater than the threshold number, the second electronic device associated with the identifier may be determined to have remained proximate to the electronic device for a duration of time greater than a threshold time. If the number of the plurality of identifying signals is equal or less than the threshold number, the second electronic device associated with the identifier may be determined to have not yet remained proximate to the electronic device for a threshold time, such that establishing a pairing with the second electronic device is not yet merited. In embodiments, a threshold number may be determined relative to a number of a plurality of signals to be received that does or does not include a first identifying signal with the identifier that is received. For example, the threshold number may be determined relative to a combination of a first and a plurality of second identifying signals that are to be received before a pairing is established or, alternately, just the plurality of second identifying signals that are to be received, not including a first identifying signal received with the identifier.

In embodiments, comparing the number to the threshold number 760 may correspond to comparing a duration of time for receiving the plurality of identifying signals to a threshold time. The correlation may be based on an association between the number and an interval at which each identifying signal is received as discussed above. In embodiments, a duration of time measured for receiving the plurality of identifying signal may also and/or additional compared. When or if the duration of time exceeds the threshold time, a pairing may be established. When or if the duration of time does not exceed the threshold time, a pairing may not be established in accordance with a received identifying signal.

If a number of a plurality of identifying signals for an identifier is greater than a threshold number, the electronic device may generate an indication of a pairing 762 between the electronic device and a second electronic device associated with the identifier. Generating the indication may include generating information associated with the identifier and storing the information in an entry for the identifier in a list of devices. Generating the indication may include adding the identifier to a list of paired electronic device, wherein the list may be separate from a list of devices with which the identifier was compared prior to a number of a plurality of identifying signals with the identifier exceeding a threshold number. After the indication of the pairing is generated, the pairing may be established between the electronic device and the second electronic device.

In embodiments, generating the indication of the pairing may include one or more operations performed in the electronic device. Additional information from a second electronic device with which the pairing is established may not be received nor required to generate the pairing. The pairing may be established on the electronic device. The pairing may be established on the electronic device independent of or without transmitting indication of the pairing to the second electronic device. For example, an indication of the pairing may be generated by the electronic device and/or stored in the electronic device. Generating the indication may involve one or more operations performed solely or exclusively on the electronic device.

In embodiments, generating the indication of the pairing may include refreshing a list of devices stored on the electronic device. Refreshing the list of devices may include removing an entry for a second electronic device with which the pairing was established, wherein an indication of the pairing may be stored separately on the electronic device. Refreshing the list of devices may also include resetting one or more of a number of a plurality of identifying signals for each other entry in the list of devices, aside from an entry associated with a second electronic device for which the indication of the pairing is generated. By resetting one or more other entries in the list of devices, the electronic device may limit a rate at which one or more additional second electronic devices may be paired with the electronic device.

If the number of the plurality of identifying signals for the identifier is equal or less than the threshold number, the electronic device may discontinue processing of the identifier and identifying signal from which the identifier was extracted. According to various aspects of the present disclosure, the electronic device may also discontinue processing of the identifier and identifying signal after one or more of updating a list of devices 722, adding an identifier to a list of devices 732, resetting an entry in the list of devices 742, and generating an indication of a pairing 754.

In embodiments, and after processing is discontinued, the electronic device may then determine if a next identifying signal is received 770. For a given identifier, the net identifying signal may include a second identifying signal for the identifier. In embodiment, a plurality of next identifying signals may be received 770 before a pairing is established with a second electronic device associated with the identifier in the plurality of identifying signals. If a next identifying signal is not received, method 700 may end.

As noted above, pairing may include establishment of an association between two electronic devices. In embodiments, the pairing may include self-pairing between the two electronic devices. Self-pairing may include a first electronic device of the two electronic devices establishing the association without or independent of any indication of the association provided to, created by, or otherwise established by a second electronic device of the two electronic devices. The self-pairing may be performed independent of or without any operations specific to the pairing being performed by the second electronic device of the two electronic devices. The self-pairing performed by the first electronic device may be implemented without a change in operations by the second electronic device. The second electronic device may perform a same set of operations when the first electronic device is paired and when the first electronic device is not paired. Indication of the pairing may not be stored on the second electronic device or otherwise received by the second electronic device, such that the second electronic device does not have computational knowledge of the pairing. Such an arrangement may simplify operations of the second electronic device, enabling the second electronic device to be associated with one or more other electronic devices independent of or without individual or direct communication with each of the one or more other electronic devices. The second electronic device may broadcast a same, common identifying signal to each of the one or more other electronic devices, avoiding a need to transmit one or more respective signals addressed to each of the one or more other electronic devices with which it is paired. In these embodiments, the self-pairing may preclude the second electronic device from being required to receive communication signals from the first electronic device, including to establish the pairing. The self-pairing may enable the pairing to be established based on one-way communication from the second electronic device to each first electronic device of one or more first electronic devices that may be self-paired with the second electronic device.

In embodiments, a method of pairing according to various aspects of the present disclosure is shown in FIG. 8. Method 800 may be implemented on an electronic device. The electronic device may be a first electronic device in the pairing between two electronic devices. For example, hub 212 may be configured to perform one or more operations of method 800, including in combination with one or more other operations disclosed herein.

To start, the electronic device may receive an identifying signal 810 as part of method 800. The identifying signal may be received via one or more of a network interface and communication unit. The identifying signal may be received wirelessly. The identifying signal may be one or more of a first identifying signal or second identifying signal received from an electronic device. In embodiments, the identifying signal may be received from a same or different electronic device as a previously received identifying signal. The identifying signal may include a broadcast packet. The identifying signal may be a broadcast signal transmitted to each electronic device with a range of communication of another electronic device that transmitted the identifying signal. The identifying signal may be unaddressed. For example, the identifying signal may include one or more of a short-range wireless beacon or advertisement. In embodiments, the identifying signal may not include an indication, address, or other identifier associated with the electronic device that receives the identifying signal 810. In embodiments, receiving the identifying signal may correspond to one or more of receiving broadcast 310 or receiving identifying signal 710 (with brief reference to FIG. 3 and FIG. 7). The electronic device may receive the identifying signal 810 independent of whether a pairing is established between the electronic device and the source of the identifying signal.

After the identifying signal is received, the electronic device may extract an identifier 812. The identifier may be extracted from the identifying signal. The identifier may be extracted from a broadcast packet in the identifying signal. The identifier may include one or more of a serial number, device number, and a device type of the transmission. In embodiments, the identifier may be associated with a second electronic device from which the identifying signal was received. The identifier may identify the second electronic device. The identifier may differentiate the second electronic device from other electronic devices from which one or more identifying signals may be respectively received by the electronic device. In embodiments, identifying sender 315 may include extracting the identifier 812 (with brief reference to FIG. 3). Extracting the identifier 812 may correspond to extracting the identifier 712 (with brief reference to FIG. 7). The extracted identifier may be stored in system memory for subsequent processing. For example, the extracted identifier may be stored in system memory temporarily in order to determine whether a pairing is established between the electronic device and another electronic device associated with the identifier.

After extracting an identifier 812, the electronic device may be configured to determine whether the identifying signal includes a request 820. The request may include information selectively included in the identifying signal. The information may enable the electronic device to perform a subsequent operation, depending on the configuration of the electronic device. For example, the request may enable the electronic device to selectively initiate one or more operations of FIG. 4-6 as described elsewhere herein. In embodiments, the request may include one or more of an activation request, a log request, and an update request.

In embodiments, the identifying signal may include a request in accordance with a status of another device from which the identifying signal is received. The status of the other electronic device from which the identifying signal is received may change. For example, the other electronic device may detect a change in state of one or more of holster, vehicle, weapon, or CEW with which the other electronic device is associated, wherein the change in state is detected by the other electronic device and reflected in a change in status of the other electronic device. The status may be reflected in information (e.g., status data, status code, etc.) included in the identifying signal. When the status changes, the request may be included in the identifying signal.

In embodiments, a first type of identifying signal may include the request, indicating that the identifying signal includes a request, while a second type of identifying signal may not include the information. The electronic device may be configured to determine whether the identifying signal includes the request in accordance with whether such information is not included in the identifying signal or included in the identifying signal. In embodiments, both the first type of identifying signal and the second type of identifying signal may include an identifier, independent of whether the identifying signal includes a request.

If the identifying signal does not include a request, the electronic device may update a list of devices 822. The list of devices may be stored in memory on the electronic device. The list of devices may include an entry for each identifier received in an identifying signal by the electronic device. Multiple identifying signal with a same identifier may be associated with a same entry in the list of devices. Updating the list of devices may include updating an entry for the identifier in the list. For example, a last received time may be updated for the entry in the list for the identifier. An elapsed time of receipt for the identifying signal may be determined. For example, a current time of receiving the identifying signal 810 may be compared to a last received time in the entry in the list for the identifier to determine the elapsed time of receipt for the identifying signal with the identifier. In embodiments, updating the list of devices 822 may include one or more operations as illustrated in FIG. 7.

If the identifying signal does include a request, the electronic device may determine whether a pairing is established 830 for the identifier. The pairing for the identifier may be established between the electronic device and another electronic device with which the identifier is associated. Determining whether the pairing is established may include determining if the pairing is established and if the pairing is not established. In embodiments, a recent association 325 may include determining whether the pairing is established 830 (with brief reference to FIG. 3). In embodiments, determining whether the pairing is established 830 may correspond to determining whether the pairing is established 720 (with brief reference to FIG. 7).

In embodiments, determining whether the pairing is established 830 may include comparing the identifier with a list of devices or list of electronic devices. The list of electronic devices may be stored in memory on the electronic device. The list may include an entry for each identifier received by the electronic device as noted above. Each entry may include a respective identifier. Each entry may further include an indication of whether a pairing is established by the electronic device with another electronic device with which the identifier associated. Comparing the identifier may include matching the identifier with an entry in the list of devices that includes the identifier and determining whether the entry further includes an indication of whether the pairing is established. The pairing may be determined to be established if the entry includes the indication. If the entry does not include the indication, the pairing may be determined to not be established.

In embodiments, a list of devices may be implemented in different manners. For example, a list of paired devices may be separate from a list of unpaired devices or devices for which a pairing has not been established. The list of paired devices may include a set of identifiers, wherein determining whether another electronic device associated with an identifier may include determining whether the identifier is included in the list. In embodiments, determining whether a pairing is established may at least include comparing the identifier to another set of data in order to determine whether the identifier is marked in the set of data as being associated with pairing established by the electronic device.

If the pairing is established, the electronic device may process the request 832. Processing the request may include performing one or more operations in accordance with the request. The operations may include receiving one or more inputs by the electronic device and/or transmitting one or more outputs from the electronic device. For example, the request may correspond to one or more operations of methods 400, 500, or 600 (with brief reference to FIGS. 4-6); in accordance with the request, the electronic device may be configured to perform one or more operations of these methods. In embodiments, processing the request 832 may include controlling a camera of the electronic device as discussed above.

If the pairing is not established, the electronic device may filter the request of the identifying signal 840. Filtering the request 840 may include ignoring (e.g., not processing, deleting, discarding, etc.) the request in the identifying signal. The request may be a valid request, such that one or more other electronic devices may be selectively configured to perform one or more operations in accordance with the request. However, the electronic device may filter the request 840 because a pairing with a source of the identifying signal, as identified by the identifier, has not been established. Filtering the request may include transmitting, receiving, recording, storing, or performing no further operation involving an input or output of the electronic device. Filtering the request 840 may include performing no additional internal operation in accordance with the request, once the determination has been made that a pairing associated with the identifier has not been established. After the request is filtered, method 900 may end.

By enabling the request to be filtered 840 at the electronic device, unintentional operations by the electronic device may be automatically avoided. For example, the electronic device may be associated with a second electronic device, intended to respond to one or more requests transmitted by the second electronic device. Should the electronic device be further, temporarily placed proximate a third electronic device, the electronic device may receive any identifying signal transmitted by the third electronic device, including an identifying signal with a request, but not perform any unintentional operation associated with the identifying signal transmitted by the third electronic device. The unintentional operations may be avoided without specific input and/or manual input being provided to the electronic device to instruct the electronic device to not respond to the identifying signals of the third electronic device. In embodiments, the electronic device may also be automatically configured to only respond to one or more requests in one or more identifying signals from the second electronic device without manual input or specific input being provided to the electronic device as well.

In embodiments according to various aspects of the present disclosure, one or more operations of each of method 700 and method 800 may be performed on each type of identifying signal received by an electronic device. The one or more operations of each method may be applied concurrently, sequentially, and/or in a shared or iterative manner to the identifying signal. In embodiments, a combination of the one or more operations of each method 700 and method 800 may be applied to a same received identifying signal. In other embodiments, one or more operations of either method 700 or method 800 may be applied to each received identifying signal in accordance with information included in the received identifying signal, such as a request included in the identifying signal or a type of the identifying signal as indicated in the received identifying signal.

In embodiments, an identifying signal including a request may be received from a second electronic device before an electronic device has established a pairing with the second electronic device. For example, a first identifying signal with an identifier associated with the second electronic device may be received to add the identifier to a list of devices. A first plurality of second identifying signals may then be received. However, the first plurality of may be less than a threshold number, such that the electronic device determines that a number of the plurality of identifying signals or secondary identifying signals with the identifier is less than the threshold number. As shown in FIG. 7, an indication of a pairing may not be generated in accordance with the first plurality of identifying signals. The first plurality of identifying signals may be received prior to establishing a pairing for the identifier. After the first plurality of the second identifying signals are received, a third identifying signal may be received from the electronic device, wherein the third identifying signal includes a first request from the second electronic device. As shown in FIG. 8, the identifying signal with the first request may be filtered in accordance with the pairing not being established and in accordance with the first plurality of identifying signals being determined to be less than the threshold number. A second plurality of second identifying signals broadcast by the second electronic device may then be received by the electronic device. A number of the second identifying signal for a combination of the second plurality of second identifying signals and the first plurality of second identifying signal may be greater than the threshold number. The electronic device may determine the number of the second identifying signals is greater than the threshold number and establish a pairing between the electronic device and the second electronic device in accordance with determining the number of the second identifying signals is greater than the threshold number. A fourth identifying signal may then be received from the second electronic device, after the second plurality of second identifying signals, wherein the fourth identifying signal includes a second request. In accordance with establishing the pairing and in accordance with determining the number of the second identifying signals is greater than the threshold number, the electronic device may process the second request as further discussed with respect to the operations of method 800 and FIG. 8. In embodiments, the first request may be received prior to the first plurality of second identifying signals and also be filtered in accordance with a pairing not being established by the electronic device and/or the electronic device determining that a number of a plurality of identifying signals with the identifier is less than the threshold number.

In embodiments, identifying signal may be received from a plurality of second electronic devices. An electronic device may be selectively paired with each second electronic device of the plurality of second electronic devices in according with a respective number of a plurality of identifying signals received from each second electronic device. For example, the electronic device may be paired with one second electronic device of the plurality of second electronic devices and not paired with another second electronic device of the plurality of second electronic devices. Each electronic device of the plurality of second electronic devices may be different from each of one or more other electronic devices of the second plurality of second electronic devices. The plurality of second electronic devices may include a plurality of separate electronic devices.

In embodiments, an electronic device may limit a number of second electronic devices with which a pairing may be established. For example, the electronic device may store a paired limit number and, when another electronic device is determined to be associated with a number of a plurality of identifying signals greater than a threshold number, the electronic device may establish a pairing with the other electronic device in accordance with the paired limited number. For example, the electronic device may compare a number of established pairings with the paired limit number. If the number of established pairings is equal to the paired limit number, the electronic device may replace a previously established pairing with a pairing associated with the other electronic device. Alternately, the electronic device may skip generation of an indication of pairing for the other electronic device and not establish a pairing with the other electronic device in accordance with the paired limit number. If the number of established pairings is less than the paired limit number, the electronic device may establish a pairing with the other electronic device. In embodiments, the paired limit number may be stored in memory on the replace a previously established pairing with a pairing associated with the other electronic device. In embodiments, the paired limit number may be one, two, three, four, five, or less than ten. In embodiments, the electronic device may not establish a pairing with another electronic device after one or more pairings are established with one or more second electronic devices. Accordingly, a request in an identifying signal received from the other device may be filtered once the one or more pairings have been established.

Figure 9:
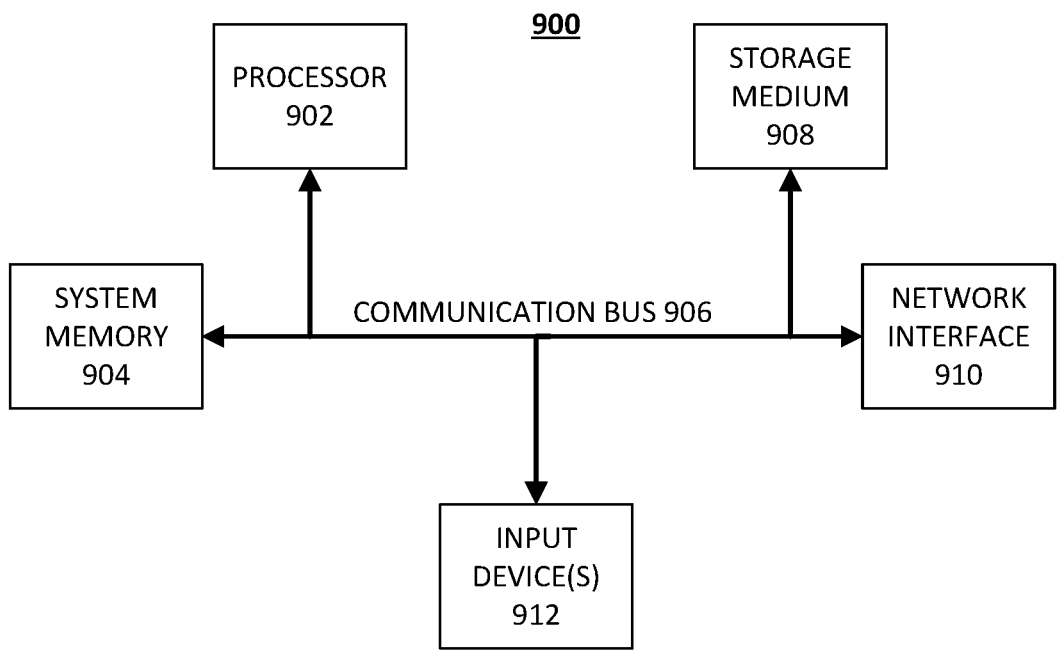
FIG. 9 is a block diagram of a computer-based system according to various aspects of the present disclosure.

In various embodiments, and with reference to FIG. 9, an exemplary computer-based system 900 is disclosed. Computer-based system 900 may be appropriate for use in accordance with embodiments of the present disclosure. The accompanying description of computer-based system 900 may be applicable to servers, personal computers, mobile phones, smart phones, tablet computers, embedded computing devices, and other currently available or yet-to-be-developed devices that may be used in accordance with embodiments of the present disclosure. For example, computer-based system 900 may correspond to hub 212 (with brief reference to FIG. 2). In embodiments, computer-based system 900 may correspond to electronic device 230 (with brief reference to FIG. 2). Each electronic device of FIG. 2 may be implemented by computer-based system 900 in embodiments according to various aspects of the present disclosure.

Computer-based system 900 may include a processor 902 and a system memory 904 connected by a communication bus 906. Depending on the exact configuration and type of computer-based system, system memory 904 may be volatile or nonvolatile memory, such as read only memory ("ROM"), random access memory ("RAM"), EEPROM, flash memory, or other memory technology. Those of ordinary skill in the art and others will recognize that system memory 904 typically stores data and/or program modules that are immediately accessible to and/or currently being operated on by processor 902. In this regard, processor 902 may serve as a computational center of computer-based system 900 by supporting the execution of instructions. Processor 902 may comprise one or more processing units, as discussed further herein. System memory 904 may comprise one or more memory units, as discussed further herein. In embodiments, system memory may store a list of devices including entries, wherein each entry of the entries is associated with a received identifier as further discussed herein.

Computer-based system 900 may include a network interface 910 comprising one or more components for communicating with other devices and systems over a network. Embodiments of the present disclosure may access basic services that utilize network interface 610 to perform communications using common network protocols. Network interface 910 may comprise a communications unit, as discussed further herein.

Computer-based system 900 may also include a storage medium 908. However, services may be accessed using a computer-based system that does not include means for persisting data to a local storage medium. Therefore, storage medium 908 depicted in FIG. 9 is optional. Storage medium 908 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 908 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory 904 and storage medium 908 depicted in FIG. 9 are examples of computer-readable media. In embodiments, the computer-readable instructions may be executed by processor 902. When executed by the processor, the instructions may cause the processor and/or the computer-based system to perform operations. The operations may include one or more operations of one or more methods disclosed herein.

For ease of illustration and because it is not important for an understanding of the claimed subject matter, FIG. 9 does not show some of the typical components of many computer-based systems. In this regard, computer-based system 900 may include input devices 912, such as a keyboard, keypad, mouse, trackball, microphone, video camera, touchpad, touchscreen, electronic pen, stylus, and/or any other input device described herein. Such input devices may be coupled to computer-based system 900 by wired or wireless connections including RF, infrared, serial, parallel, Bluetooth, USB, or other suitable connection protocols using wireless or physical connections. In embodiments, one or more input devices 912 may implement camera 222 (with brief reference to FIG. 2).

In any of the described examples, data can be captured by one or more input devices 912 and transmitted or stored for future processing. The processing may include encoding data streams, which can be subsequently decoded for presentation by output devices. Media data can be captured by multimedia input devices of input devices 912 and stored by saving media data streams as files on a computer-readable storage medium (e.g., in memory or persistent storage on a client device, server, administrator device, or some other device). For example, media data may be stored in storage medium 908. Input devices 912 can be separate from and communicatively coupled to computer-based system 900 (e.g., a client device), or can be integral components of computer-based system 900. In some embodiments, multiple input devices may be combined into a single, multifunction input device (e.g., a video camera with an integrated microphone). In embodiments, one or more of storage medium 908 and processing circuit 902 may implement one or more functions of DVR 223 (with brief reference to FIG. 2).

Computer-based system 900 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to computer-based system 900, or can be integral components of computer-based system 900. Input functionality and output functionality may be integrated into the same input/output device (e.g., a touchscreen). Any suitable input device, output device, or combined input/output device either currently known or developed in the future may be used with described systems.

In various embodiments, a "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Two or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein may include relational, hierarchical, graphical, distributed ledger, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

Figure 2:
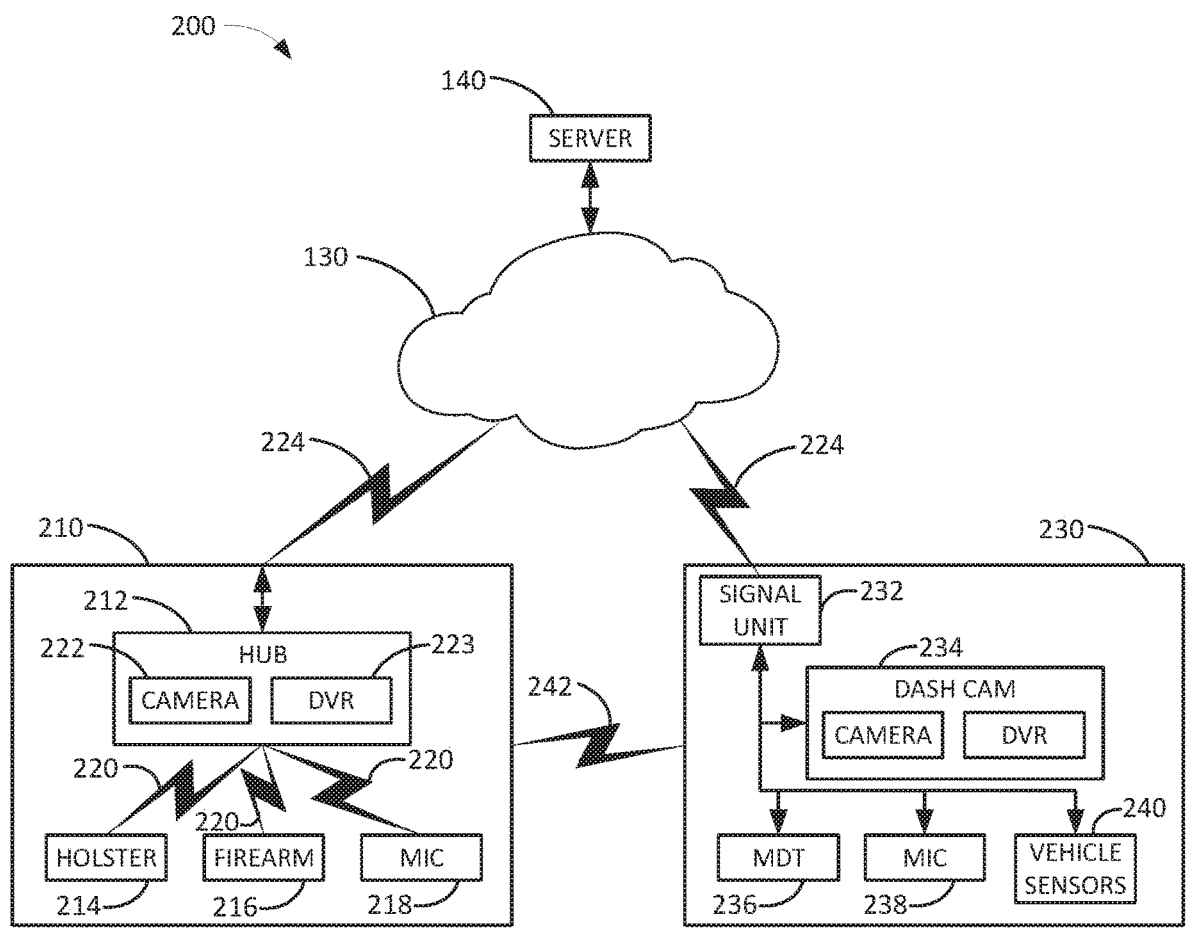
FIG. 2 is a functional block diagram of an implementation of the environment of FIG. 1.

In embodiments, one or more elements of computer-based system 900 may correspond (e.g., include, implement, perform one or more functions of, etc.) to one or more elements discussed above, including as discussed in the context of FIG. 2. For example, processor 902 may include a processing circuit. Network interface 910 may include a communication circuit. Other correspondence between other elements disclosed herein may also exist, as will be appreciated by one of ordinary skill in the art.

In embodiments, one or more operations of methods 300-800 may be performed by one or more electronic devices. For example, method 700 may be performed by a plurality of computer-based systems, wherein each computer-based system includes computer-based system 900. The one or more electronic devices may include one or more of a body worn camera, hub, and a server. In embodiments, one or more operations may be performed by at least one electronic device according to various aspects of the present disclosure.

In embodiments, a method of dynamically pairing a first electronic device with a second electronic device is provided, the method may comprise receiving, by the first electronic device, a plurality of identifying signals broadcast by the second electronic device, each identifying signal of the plurality of identifying signals including a same identifier associated with the second electronic device; determining, by the first electronic device, a number of the plurality of identifying signals; comparing, by the first electronic device, the number of the plurality of identifying signals with a threshold number; and establishing, by the first electronic device, a pairing between the first electronic device and the second electronic device if the number of the plurality of identifying signals is greater than the threshold number in accordance with the comparison of the number of the plurality of identifying signals with the threshold number. Determining the number may include incrementing the number upon receipt of each identifying signal of the plurality of identifying signals. Determining the number may include determining an elapsed time of receipt for each identifying signal. Determining the number may include increasing the number if or when the elapsed time of receipt is less than a threshold time. Determining the number may include resetting the number to default value if or when the elapsed time of receipt is greater than the threshold time. The threshold time may be at least thirty seconds. Comparing the number may include determining that the number is less than the threshold number. Comparing the number may include receiving an identifying signal comprising a request when the number is determined to be less than the threshold number and filtering the request in accordance with the determination that the number is less than the threshold number. Filtering the request may include ignoring the request. The pairing may be established at the first electronic device and/or independent of the second electronic device. Establishing the pairing may include receiving an identifying signal comprising a request and processing the request in accordance determining that the number is greater than the threshold number. The identifying signal may be broadcast by the second electronic device to one or more other electronic devices in a range of communication of the second electronic device, the one or more other electronic devices including the electronic device. Receiving the plurality of identifying signals may include receiving the plurality of identifying signals via one-way communication from the second electronic device to the electronic device. Establishing the pairing may include establishing the pairing in accordance with one-way communication from the second electronic device and the first electronic device. The first electronic device may include a body worn camera. The second electronic device may include an electronic device mounted in a vehicle. In embodiments, an electronic device may be configured to dynamic self-pair with a second electronic device and the self-pairing may include one or more operations disclosed herein. In embodiments, devices and/or methods for filtering a request may be provided, wherein the devices and methods may implement or include one or more operations disclosed herein.

In embodiments, a method for creating a pairing between a hub and an electronic device is provided, the method comprising receiving, by the hub, an identifier broadcast by the electronic device; determining, by the hub, a proximity of the electronic device; measuring, by the hub, a duration of time the hub receives the identifier; and establishing the pairing between the hub and the electronic device if the electronic device remains proximal to the hub for the duration of time. Receiving the identifier broadcast by the electronic device may include receiving the identifier in a first identifying signal broadcast by the electronic device and determining the proximity of the electronic device may include receiving at least one second identifying signal broadcast by the electronic device, each second identifying signal different from the first identifying signal and each second identifying signal including the identifier. The at least one second identifying signal broadcast by the electronic device may include at least thirty identifying signals broadcast by the electronic device. The at least one second identifying signal broadcast by the electronic device may include a plurality of second identifying signals broadcast by the electronic device. Measuring the duration of time the hub receives the identifier may include determining a number of the plurality of second identifying signals is less than a threshold number; receiving a third identifying signal broadcast from the electronic device, the third identifying signal including a request from the electronic device; and filtering the request from the electronic device in accordance with determining the number of the plurality of second identifying signals is less than the threshold number. The filtering may include ignoring the request. Measuring the duration of time the hub receives the identifier may include determining an elapsed time of receipt for each second identifying signal of the plurality of second identifying signals. Measuring the duration of time the hub receives the identifier may include comparing each elapsed time of receipt to a threshold time; and determining the electronic device remains proximal to the hub for the duration of time if each elapsed time of receipt is less than the threshold time. Measuring the duration of time may include determining the electronic device remains proximal to the hub for the duration of time if a number of the plurality of second identifying signals is greater than a threshold number. Establishing the pairing between the hub and the electronic device may include storing an indication of the pairing on the hub. Establishing the pairing between the hub and the electronic device may include receiving an identifying signal broadcast from the electronic device, the identifying signal including the identifier and a request; and processing the request in accordance with the indication of the pairing stored on the hub. The electronic device may include a first electronic device and the method may further comprise receiving an identifying signal from a second electronic device, different from the first electronic device, the identifying signal including a second identifier and a request; in accordance with the second identifier, determining a second pairing between the hub and the second electronic device has not been established on the first electronic device; and filtering the request in accordance with determining the second pairing between the hub and the second electronic device has not been established on the first electronic device. The hub may include a body worn camera.

In embodiments, a system for automatic pairing of electronic devices is provided, the system comprising an electronic device with a signal unit, the signal unit configured to broadcast a plurality of identifying signals, each identifying signal of the plurality of identifying signals including an identifier identifying the electronic device; and a portable hub with a camera, the portable hub configured to receive the plurality of identifying signals; measure a duration of time over which the plurality of identifying signals is received identifier associated with the electronic device is received; establish a pairing with the electronic device if the duration of time exceeds a threshold time; and control the camera in accordance with the pairing with the electronic device. The portable hub may be configured to measure the duration of time in accordance with a number of the plurality of identifying signals. The threshold time may be associated with a threshold number of identifying signals and establishing the pairing with the electronic device may include establishing the pairing with the electronic device if the number of the plurality of identifying signals is greater than the threshold number of identifying signals. Receiving the plurality of identifying signals may include determining an elapsed time of receipt for each identifying signal of the plurality of identifying signals. Measuring the duration of time may include, for each identifying signal of the plurality of identifying signals, comparing the elapsed time of receipt for the identifying signal to a threshold time; and resetting the number of the plurality of identifying signals if the elapsed time of receipt is greater than the threshold time. Measuring the duration of time may include, for each identifying signal of the plurality of identifying signals, comparing the elapsed time of receipt for the identifying signal to a threshold time; and incrementing the number of the plurality of identifying signals if the elapsed time of receipt is less than the threshold time.

In embodiments, a hub for automatic pairing with an electronic device is provided, the hub including a camera; a communication circuit; a processor; and a non-transitory computer-readable medium configured to store computer-readable instructions that, when executed by the processor, cause the processor to perform operations including receiving a plurality of identifying signals broadcast by the electronic device, each identifying signal of the plurality of identifying signals including a same identifier; measuring a duration of time over which the plurality of identifying signals is received; and establishing a pairing with the electronic device if the duration of time exceeds a threshold time. The operations further comprise receiving a second identifying signal from the electronic device, the second identifying signal including the same identifier and a request; determining the duration of time does not exceed the threshold time; and filtering the request in accordance with determining the duration of time does not exceed the threshold time, wherein the pairing with the electronic device is not established when the duration of time does not exceed the threshold time.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The location indicators "herein", "hereunder", "above", "below", or other word that refer to a location, whether specific or general, in the specification shall be construed to refer to any location in the specification where the location is before or after the location indicator.

What is claimed is:

1. A method for creating a pairing between a hub and an electronic device, the method comprising:
   receiving, by the hub, an identifier broadcast by the electronic device;
   determining, by the hub, a proximity of the electronic device;
   measuring, by the hub, a duration of time the hub receives the identifier;
   determining, by the hub, the electronic device remains proximal to the hub for the duration of time; and
   in response to determining the electronic device remains proximal to the hub for the duration of time, establishing the pairing between the hub and the electronic device.

2. The method of claim 1, wherein:
   receiving the identifier broadcast by the electronic device includes receiving the identifier in a first identifying signal broadcast by the electronic device; and
   determining the proximity of the electronic device includes receiving at least one second identifying signal broadcast by the electronic device, each second identifying signal different from the first identifying signal and each second identifying signal including the identifier.

3. The method of claim 2, wherein the at least one second identifying signal broadcast by the electronic device includes at least thirty identifying signals broadcast by the electronic device.

4. The method of claim 2, wherein the at least one second identifying signal broadcast by the electronic device includes a plurality of second identifying signals broadcast by the electronic device.

5. The method of claim 4, wherein measuring the duration of time the hub receives the identifier includes determining a number of the plurality of second identifying signals is less than a threshold number;
   receiving a third identifying signal broadcast from the electronic device, the third identifying signal including a request from the electronic device; and
   ignoring the request from the electronic device in accordance with determining the number of the plurality of second identifying signals is less than the threshold number.

6. The method of claim 4, wherein measuring the duration of time the hub receives the identifier includes determining an elapsed time of receipt for each second identifying signal of the plurality of second identifying signals.

7. The method of claim 6, wherein measuring the duration of time the hub receives the identifier includes:
   comparing each elapsed time of receipt to a threshold time;
   determining each elapsed time of receipt is less than the threshold time; and
   determining the electronic device remains proximal to the hub for the duration of time comprises:
      determining the electronic device remains proximal to the hub for the duration of time in accordance with determining each elapsed time of receipt is less than the threshold time.

8. The method of claim 4, wherein measuring the duration of time includes determining a number of the plurality of second identifying signals is greater than a threshold number; and
   determining the electronic device remains proximal to the hub for the duration of time comprises determining the electronic device remains proximal to the hub for the duration of time in accordance with determining the number of the plurality of second identifying signals is greater than the threshold number.

9. The method of claim 1, wherein establishing the pairing between the hub and the electronic device includes storing an indication of the pairing on the hub.

10. The method of claim 9, wherein establishing the pairing between the hub and the electronic device includes:
   receiving an identifying signal broadcast from the electronic device, the identifying signal including the identifier and a request; and
   processing the request in accordance with the indication of the pairing stored on the hub.

11. The method of claim 1, wherein the electronic device includes a first electronic device; and the method further comprises:
   receiving, by the hub, an identifying signal from a second electronic device, different from the first electronic device, the identifying signal including a second identifier and a request;
   in accordance with the second identifier, determining, by the hub, a second pairing between the hub and the second electronic device has not been established on the hub; and
   filtering, by the hub, the request in accordance with determining the second pairing between the hub and the second electronic device has not been established on the hub.

12. The method of claim 1, wherein the hub includes a body worn camera.

13. A system for automatic pairing of electronic devices, comprising:
   an electronic device with a network interface, the network interface configured to broadcast a plurality of identifying signals, each identifying signal of the plurality of identifying signals including an identifier identifying the electronic device; and
   a portable hub with a camera, the portable hub configured to perform operations comprising:
      receiving the plurality of identifying signals;
      measuring a duration of time over which the plurality of identifying signals is received;
      establishing a pairing with the electronic device if the duration of time exceeds a first threshold time; and
      controlling the camera in accordance with the pairing with the electronic device.

14. The system of claim 13, wherein the portable hub is configured to measure the duration of time in accordance with a number of the plurality of identifying signals.

15. The system of claim 14, wherein the first threshold time is associated with a threshold number of identifying signals and establishing the pairing with the electronic device includes establishing the pairing with the electronic device if the number of the plurality of identifying signals is greater than the threshold number of identifying signals.

16. The system of claim 15, wherein receiving the plurality of identifying signals includes determining an elapsed time of receipt for each identifying signal of the plurality of identifying signals.

17. The system of claim 16, wherein measuring the duration of time includes:
   for each identifying signal of the plurality of identifying signals, comparing the elapsed time of receipt for the identifying signal to a second threshold time; and
   resetting the number of the plurality of identifying signals if the elapsed time of receipt is greater than the second threshold time.

18. The system of claim 16, wherein measuring the duration of time includes:
   for each identifying signal of the plurality of identifying signals, comparing the elapsed time of receipt for the identifying signal to a second threshold time; and
   incrementing the number of the plurality of identifying signals if the elapsed time of receipt is less than the second threshold time.

19. A hub for automatic pairing with an electronic device, the hub including:
   a camera;
   a communication circuit;
   a processor; and
   a non-transitory computer-readable medium configured to store computer-readable instructions that, when executed by the processor, cause the processor to perform operations including:
      receiving a plurality of identifying signals broadcast by the electronic device, each identifying signal of the plurality of identifying signals including a same identifier;
      measuring a duration of time over which the plurality of identifying signals is received; and
      establishing a pairing with the electronic device if the duration of time exceeds a threshold time.

20. The hub of claim 19, wherein the operations further comprise:
   receiving a second identifying signal from the electronic device, the second identifying signal including the same identifier and a request;
   determining the duration of time does not exceed the threshold time; and
   filtering the request in accordance with determining the duration of time does not exceed the threshold time, wherein the pairing with the electronic device is not established when the duration of time does not exceed the threshold time.

* * * * *